July 23, 1968 T. C. BAKER 3,394,263
METHOD AND APPARATUS FOR INSPECTING TRANSPARENT
ARTICLES FOR DEFECTS BY FLUORESCENT RADIATION
Filed Dec. 28, 1964

INVENTOR.
THEODORE C. BAKER
BY
ATTORNEYS

United States Patent Office 3,394,263
Patented July 23, 1968

3,394,263
METHOD AND APPARATUS FOR INSPECTING TRANSPARENT ARTICLES FOR DEFECTS BY FLUORESCENT RADIATION
Theodore C. Baker, Wayne, Ohio, assignor to Owens-Illinois, Inc., a corporation of Ohio
Filed Dec. 28, 1964, Ser. No. 421,573
10 Claims. (Cl. 250—223)

ABSTRACT OF THE DISCLOSURE

There is disclosed herein a method and apparatus for inspecting transparent articles for defects which comprises directing a beam of radiation against the article which has a wave length that causes fluorescence of the material of the article so that the interior wall of the article is illuminated by a light pipe effect as is well known in fiber optics. A defect in the wall of the container causes a portion of the fluorescent illumination to be redirected out of the wall of the container against a radiation energy detecting device. The radiation energy detecting device is sensitive to fluorescent energy but insensitive to the radiation of the beam so that surface reflections from the surfaces of the article will not affect the inspection.

This invention relates to inspecting transparent articles for defects and particularly to inspecting hollow transparent containers for defects.

It has heretofore been suggested and conventional to inspect hollow transparent containers for defects by directing a beam of light against the wall of the container and causing a defect to reflect a portion of the beam out of the container where it is sensed by a light sensitive device. One of the major problems with such a method of inspection is that the surfaces of the container tend to also reflect light and interfere with the inspection by producing false signals.

The present invention is directed to a method and apparatus for inspecting transparent articles for defects wherein interference because of surface reflections is entirely eliminated.

It is a further object of the invention to provide such a method and apparatus wherein rotation of the article may be eliminated.

It is a further object of the invention to provide such a method and apparatus wherein narrow neck hollow transparent containers can be inspected without insertion of probes and the like into the container.

Basically, the invention comprises directing a beam of radiation against the article which has a wave length that causes fluorescence of the material of the article so that the interior wall of the article is illuminated by a light pipe effect as is well known in fiber optics. A defect in the wall of the container causes a portion of the fluorescent illumination to be redirected out of the wall of the container against a radiation energy detecting device. The radiation energy detecting device is sensitive to fluorescent energy but insensitive to the radiation of the beam so that surface reflections from the surfaces of the article will not affect the inspection.

Figure 1:
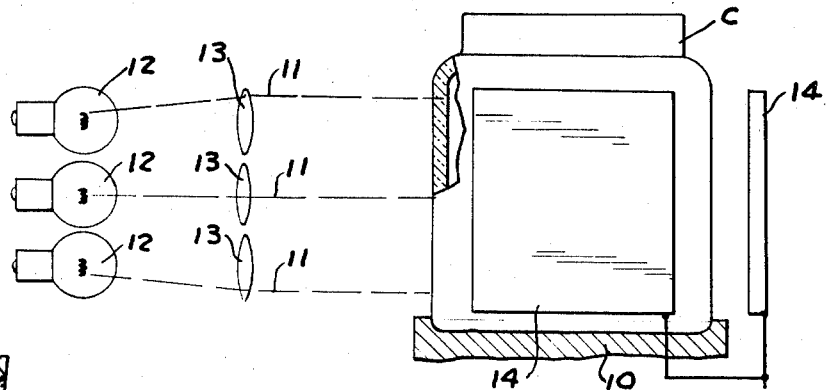
FIG. 1 is a partly diagrammatic, part sectional elevational view of an apparatus embodying the invention.
Figure 2:
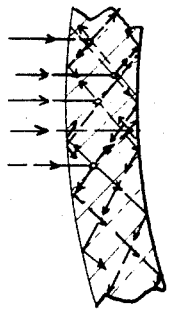
FIG. 2 is a sectional view through a wall of the container shown in FIG. 1, showing diagrammatically the path of the rays of radiant energy.

Referring to FIGS. 1 and 2, the invention contemplates inspection of a hollow transparent container C made of glass or the like. The term "transparent," as used herein is intended to include materials which can be caused to fluoresce and emit radiant energy of certain wave lengths.

As shown in FIG. 1, the container C is supported on a pad 10 in position for inspection and a plurality of light beams 11 are directed against a portion of the side wall of the container. The beams emanate from sources 12 and are preferably collimated by collimating lenses 13.

In accordance with the invention, the sources 12 emit radiant energy of a wave length which will not be transmitted through the wall of the container C, but will cause the material of the container to fluoresce. In the case of glass, such a source may comprise far ultraviolet rays or soft X-rays. The radiant energy thus may vary in wave length from ten angstroms to 2000 angstroms.

I have found that when such beams of radiant energy are directed against the wall of a container, made for example from glass, the material of the container is caused to fluoresce and the resultant light is transmitted within the wall by a light pipe effect as is well known in fiber optics. This is shown diagrammatically by the arrows in FIG. 2.

Figure 3:
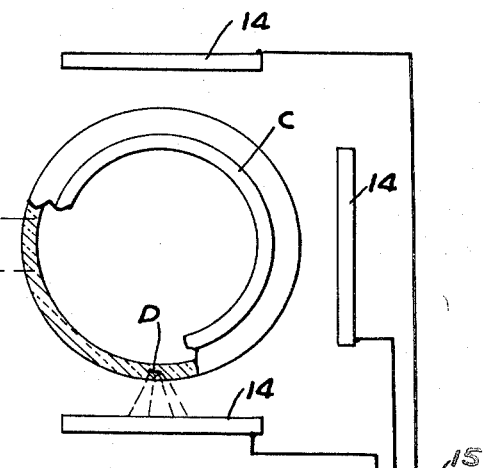
FIG. 3 is a part sectional plan view of the apparatus shown in FIG. 1.

As shown in FIGS. 1 and 3, a plurality, of radiant energy detecting or sensing devices 14 are provided in close proximity to the wall of the container C. Such devices may comprise silicon solar cells or other photo sensitive devices. In accordance with the invention, it is essential that these devices 14 be insensitive to the radiant energy from the sources 12 and sensitive to the fluorescent illumination in the wall of the container C.

When a defect is present in the wall of the container, it will cause a portion of the fluorescent illumination to be deflected out of the wall of the container. This deflection may occur due to reflection, refraction or a combined reflection and refraction of the fluorescent illumination. Thus, various defects in the wall such as checks which are mirror-like defects, seeds, blisters and the like will cause the deflection of fluorescent illumination out of the wall to the devices 14. When any of the devices 14 is energized, the resultant signal is amplified by the amplifier 15 and caused to produce a reject signal or an actual reject of the container C.

Since the devices 14 are not sensitive to the wave lengths of the beams from the sources 12, any surface reflections of such beams do not affect the devices 14 and therefore false signals are entirely eliminated.

If the diameter of the container C is relatively small, no rotation of the container is needed since sufficient fluorescent illumination will occur around the periphery of the wall of the container to illuminate the entire wall.

Figure 4:
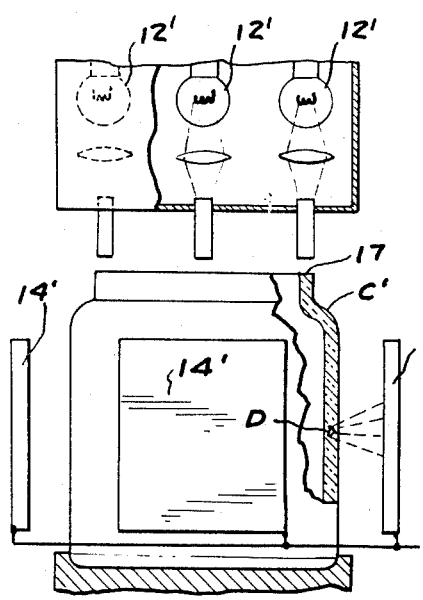
FIG. 4 is a part sectional elevational view of a modified form of apparatus.
Figure 5:
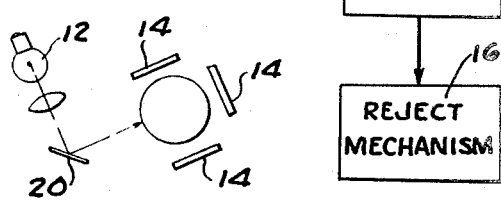
FIG. 5 is a diagrammatic plan view of a further modified form of apparatus.

In the form of the invention shown in FIG. 4, the illumination of the wall of the container C′ is achieved by directing a plurality of light beams from sources 12′ down through the wall to cause fluorescent illumination of the wall. Sensitive devices 14′ are positioned about the periphery of the wall in close proximity so that any defects D deflect the portion of fluorescent illumination to the devices 14′ and thereby create a reject signal. In this form of the invention, if sufficient sources 12′ are provided around the upper end of the neck 17, no rotation of the container is needed.

Where the container is of substantial diameter and sufficient fluorescent illumination cannot be achieved of the entire periphery of the container without rotating the container, the beam from the sources 12 can be caused to scan a portion of the wall of the container as shown in FIG. 5 by movable reflecting surface 20. This sufficiently illuminates successive portions of the walls to produce a complete inspection of the container without rotation.

It can thus be seen that there has been provided a method and apparatus for inspecting containers without the inherent problems of surface reflections.

I claim:

1. The method of detecting defects in transparent articles which comprises
  directing a beam of radiant energy against a wall of the article,
  said energy being of a wave length to cause fluorescence of the material of the container and illuminate the wall of the article internally,
  causing a defect to redirect a portion of the fluorescent illumination out of the wall of the article,
  directing said redirected portion against a radiant energy detecting device which is sensitive to the fluorescent energy and insensitive to the radiant energy of said beam,
  and creating a signal in response to energization of said device.

2. The method of detecting defects in hollow transparent containers which comprises
  directing a collimated beam of radiant energy against a wall of the container,
  said energy being of a wave length to cause fluorescence of the material of the container and illuminate the wall of the container internally,
  causing a defect to redirect a portion of the fluorescent illumination out of the wall of the container,
  directing said redirected portion against a radiant energy detecting device which is sensitive to the fluorescent energy and insensitive to the radiant energy of said beam,
  and creating a signal in response to energization of said device.

3. The method of detecting defects in hollow transparent containers which comprises
  directing a beam of radiant energy against a wall of the container,
  said energy being of a wave length lying in the portion of the spectrum ranging between far ultra-violet and soft X-rays to cause fluorescence of the material of the container and illuminate the wall of the container internally,
  causing a defect to redirect a portion of the fluorescent illumination out of the wall of the container,
  directing said redirected portion against a radiant energy detecting device which is sensitive to the fluorescent energy and insensitive to the radiant energy of said beam,
  and creating a signal in response to energization of said device.

4. The method of detecting defects in hollow transparent containers which comprises
  directing a beam of invisible radiant energy against a wall of the container,
  said energy being of a wave length to cause visible fluorescence of the material of the container and illuminate the wall of the container internally,
  causing a defect to redirect a portion of the fluorescent illumination out of the wall of the container,
  directing said redirected portion against a radiant energy detecting device which is sensitive to the visible fluorescent energy and insensitive to the invisible radiant energy from said beam,
  and creating a signal in response to energization of said device.

5. The method of detecting defects in hollow transparent containers which comprises
  directing a beam of radiant energy against the exterior surface of a wall of the container,
  said energy being of a wave length to cause fluorescence of the material of the container and illuminate the wall of the container internally,
  causing a defect to redirect a portion of the fluorescent illumination out of the wall of the container through said exterior surface,
  positioning a plurality of radiant energy detecting devices which are sensitive to the fluorescent energy and insensitive to the radiant energy from said beam adjacent the exterior surface of the wall of the container,
  directing said redirected portion against at least one of said devices,
  and creating a signal in response to energization of said device.

6. The method of detecting defects in hollow transparent containers which comprises
  directing a beam of radiant energy against the neck of the container axially of the container,
  said energy being of a wave length to cause fluorescence of the material of the container and illuminate the wall of the container internally by a light pipe effect,
  causing a defect to redirect a portion of the fluorescent illumination out of the wall of the container,
  directing said redirected portion against a radiant energy detecting device which is sensitive to the fluorescent energy and insensitive to the radiant energy from said beam,
  and creating a signal in response to energization of said device.

7. An apparatus for detecting defects in the wall of a transparent article which comprises
  means for directing a beam of radiant energy against a wall of the article,
  said energy being of the wave length to cause fluorescence in the wall of the article and illumination of the wall by a light pipe effect,
  a radiation sensitive device positioned adjacent the wall of the container in the path of redirection of the portion of the fluorescent light when the fluorescent light encounters a defect in the wall of the article,
  said radiation sensitive device being sensitive to said fluorescent illumination and insensitive to the radiant energy of said beam,
  and means responsive to energization of said radiation sensitive device for creating a reject signal.

8. An apparatus for detecting defects in the wall of a hollow transparent container which comprises
  means for directing a beam of radiant energy against a wall of the container,
  said energy being of the wave length to cause fluorescence in the wall of the container and illumination of the wall by a light pipe effect,
  a plurality of radiation sensitive devices positioned in close proximity to the outer surface of the wall of the container in the path of redirection of the portion of the fluorescent light when the fluorescent light encounters a defect in the wall of the container,
  said radiation sensitive devices being sensitive to said fluorescent illumination and insensitive to the radiant energy of said beam,
  and means responsive to energization of one of said radiation sensitive devices for creating a reject signal.

9. An apparatus for detecting defects in the wall of a hollow transparent container which comprises
  means for directing a beam of radiant energy against the outer surface of a wall of the container,
  said energy being of the wave length to cause fluorescence in the wall of the container and illumination of the wall by a light pipe effect,
  a plurality of radiation sensitive devices positioned in close proximity to the outer surface of the wall of the container in the path of redirection of the portion of the fluorescent light when the fluorescent light encounters a defect in the wall of the container, each said radiation sensitive device having a radiation sensitive surface with a width greater than the maximum radius of said container, said radiation sensitive devices being sensitive to said fluorescent illumination and insensitive to the radiant energy of said beam, and means responsive to energization of one of said radiation sensitive devices for creating a reject signal.

10. An apparatus for detecting defects in the wall of a hollow transparent container which comprises means for directing a beam of radiant energy against the neck of the container axially of the container, said energy being of the wave length to cause fluorescence in the wall of the container and illumination of the wall by a light pipe effect, a plurality of radiation sensitive devices positioned in close proximity to the outer surface of the side wall of the container in the path of redirection of the portion of the fluorescent light when the fluorescent light encounters a defect in the wall of the container, said radiation sensitive devices being sensitive to said fluorescent illumination and insensitive to the radiation energy of said beam, and means responsive to energization of one of said radiation sensitive devices for creating a reject signal.

References Cited

UNITED STATES PATENTS

| | | |
|---|---|---|
| 3,341,010 | 9/1967 | Switzer. |
| 3,249,224 | 5/1966 | Uhlig _____ 209—111.7 |
| 3,302,786 | 2/1967 | Conrad. |
| 3,317,738 | 5/1967 | Piepenbrink et al. |
| 3,328,000 | 6/1967 | Rottmann. |

RALPH G. NILSON, *Primary Examiner.*

M. A. LEAVITT, *Assistant Examiner.*